United States Patent
Gibson

(10) Patent No.: US 9,441,706 B2
(45) Date of Patent: Sep. 13, 2016

(54) DRIVE BELT FOR TRANSMITTING A DRIVE MOVEMENT, AND METHOD FOR PRODUCING A DRIVE BELT

(75) Inventor: Daniel Pattie Gibson, Hoexter (DE)

(73) Assignee: Arntz Beteiligungs GmbH & Co. KG, Hoexter (DE)

( * ) Notice: Subject to any disclaimer, the term of this patent is extended or adjusted under 35 U.S.C. 154(b) by 335 days.

(21) Appl. No.: 13/882,227

(22) PCT Filed: Sep. 8, 2011

(86) PCT No.: PCT/DE2011/001697
§ 371 (c)(1),
(2), (4) Date: Apr. 29, 2013

(87) PCT Pub. No.: WO2012/059076
PCT Pub. Date: May 10, 2012

(65) Prior Publication Data
US 2013/0225346 A1    Aug. 29, 2013

(30) Foreign Application Priority Data

Nov. 3, 2010   (DE) .................. 10 2010 043 322

(51) Int. Cl.
| | |
|---|---|
| F16G 1/00 | (2006.01) |
| F16G 5/00 | (2006.01) |
| F16G 9/00 | (2006.01) |
| F16G 1/28 | (2006.01) |
| F16G 5/20 | (2006.01) |
| F16G 1/10 | (2006.01) |
| F16G 1/08 | (2006.01) |

(Continued)

(52) U.S. Cl.
CPC ............... *F16G 1/10* (2013.01); *B29D 29/08* (2013.01); *F16G 1/08* (2013.01); *F16G 1/16* (2013.01); *F16G 1/28* (2013.01); *F16G 5/20* (2013.01)

(58) Field of Classification Search
CPC .............. F16G 1/28; F16G 5/20; F16G 1/08; B29D 29/08; D07B 2801/12
USPC ......................................... 474/204, 205, 260
See application file for complete search history.

(56) References Cited

U.S. PATENT DOCUMENTS 3,349,634 A * 10/1967 Terhune et al. ............... 474/250
3,772,929 A * 11/1973 Redmond, Jr. ............... 474/205

(Continued)

FOREIGN PATENT DOCUMENTS

DE    19855294 A1    6/1999
DE    19801253 C2    1/2000

(Continued)

*Primary Examiner* — Henry Liu
(74) *Attorney, Agent, or Firm* — Patent Central LLC; Stephan A. Pendorf

(57) ABSTRACT

A drive belt having a belt body which is made of a flexible material and a tensile reinforcement that extends in belt axial direction and which is surrounded by said belt body in sections at least to improve the tensile strength of the body in belt longitudinal direction wherein the tensile reinforcement is a carbon cord made of a plurality of twisted carbon fibers with a plurality of cavities between the fibers which are charged with a filler material in part at least. A first portion of the carbon fiber cavities is charged with a rupture risk reducing filler of a type different from the belt body flexible material and a second portion of said cavities of the carbon fibers is filled with belt body flexible material. The carbon cord has less than 0.2 mg of belt body flexible material per one millimeter$^3$ cord volume.

14 Claims, 1 Drawing Sheet

(51) Int. Cl.
*F16G 1/16* (2006.01)
*B29D 29/08* (2006.01)

(56) References Cited

U.S. PATENT DOCUMENTS

| | | | |
|---|---|---|---|
| 4,747,812 A * | 5/1988 | Matsuoka et al. | 474/252 |
| 4,892,510 A * | 1/1990 | Matsuoka et al. | 474/252 |
| 5,807,194 A * | 9/1998 | Knutson et al. | 474/268 |
| 8,211,502 B2 * | 7/2012 | DiMascio et al. | 427/316 |
| 2004/0132571 A1 * | 7/2004 | Knutson | 474/260 |
| 2007/0249452 A1 * | 10/2007 | South | 474/263 |
| 2008/0032130 A1 * | 2/2008 | Akiyama et al. | 428/375 |
| 2009/0075079 A1 * | 3/2009 | Imanishi et al. | 428/375 |
| 2009/0142572 A1 * | 6/2009 | Burlett | 428/295.1 |
| 2009/0227406 A1 * | 9/2009 | Wu et al. | 474/238 |
| 2009/0229237 A1 * | 9/2009 | Imanishi et al. | 57/204 |
| 2010/0136332 A1 * | 6/2010 | Murayama et al. | 428/367 |
| 2010/0323835 A1 * | 12/2010 | Furukawa et al. | 474/260 |
| 2011/0269589 A1 * | 11/2011 | Schleicher et al. | 474/205 |

FOREIGN PATENT DOCUMENTS

| | | |
|---|---|---|
| EP | 0841500 B1 | 3/2003 |
| EP | 1762654 A1 | 3/2007 |
| EP | 2133462 A1 | 12/2009 |
| WO | 02055920 A2 | 7/2002 |
| WO | 2004057209 A1 | 7/2004 |
| WO | 2010066505 A1 | 6/2010 |

* cited by examiner

DRIVE BELT FOR TRANSMITTING A DRIVE MOVEMENT, AND METHOD FOR PRODUCING A DRIVE BELT

BACKGROUND OF THE INVENTION

1. Field of the Invention

This present invention relates to a drive belt having a belt body which is made of a flexible material and a tensile reinforcement that extends in belt axial direction and which is surrounded by said belt body in sections at least to improve the tensile strength of the body in belt longitudinal direction wherein the tensile reinforcement is a carbon cord consisting of a plurality of twisted carbon fibers with a plurality of cavities between said fibers which are filled with a filler material in part at least.

2. Description of the Related Art

The invention also relates to a process for making a drive belt, which has a belt body made of a flexible material and carbon cords surrounded by said belt body in sections at least and extends in a belt longitudinal direction to improve the tensile strength of the body wherein the carbon cords consist of a plurality of carbon fibers which are twisted into a yarn and embedded into the curable flexible material forming the belt body.

Prior known from EP 0 841 500 B1 is a drive belt for transmitting a drive motion which comprises a belt body made of polyurethane as hardenable flexible material. A carbon cord is embedded in the belt body in a longitudinal direction thereof to provide a tensile reinforcement. Said carbon cord is formed by a plurality of twisted carbon fibers and dependent on the geometry of the carbon fibers and the production process has cavities between the fibers. Polyurethane is cast around said carbon cord with cavities to provide the belt body. Part of the polyurethane penetrates into said gaps of the carbon cord in the course of the casting process. The amount of polyurethane to be cast around the carbon cord is 0.20 mg, 0.24 mg or 0.28 mg per 1 mm cord volume even though larger amounts of polyurethane are considered advantageous. The drawback involved in this case is that the polyurethane contained inside the carbon fiber cavities makes the drive belt undesirably hard after curing which means that penetration of polyurethane into the carbon cord reduces the flexibility of the drive belt and increases the bending modulus thereof with the consequence that the carbon cord would be exposed to unacceptably severe loads as it turns around belt pulleys which might cause damages to (in particular ruptures of) the carbon cords and hence give rise to failures of the drive belt and a reduction of service life thereof.

It is an object of this present invention, therefore, to improve a drive belt and a process for making it in such a way that the flexibility and the service life of the belt will be increased after polyurethane has been poured around the carbon cords.

BRIEF SUMMARY OF THE INVENTION

To achieve this object the invention is in conjunction with the preamble of Patent claim 1 characterized in that a rupture risk reducing filler material of a type other than the flexible material for the belt body is disposed in a first portion of the cavities between the carbon fibers and the flexible material forming the belt body in a second portion of the cavities between said fibers wherein the amount of belt body flexible material applied to the carbon cord is less than 0.2 mg per $mm^3$ cord volume.

The particular advantage of this present invention resides in that by filling the cavities of a carbon cord with a filler the amount of belt body flexible material which is apt to penetrate into the cavities of the carbon cord in the course of pouring is reduced on the one hand and that the filler material is of rupture risk reducing type and featured by the fact that it remains flexible even after curing of the flexible material forming the belt body on the other hand. To this end, the rupture risk reducing filler material is exhibiting favorable properties in regard to stress behavior, adhesion and flexural strength as well as low brittleness. It is by a combined effect of both of these measures that hardening and/or embrittlement of the carbon cord is counteracted. Carbon cord flexibility is substantially kept up with the consequence that the bending load acting on the drive belt during operational performance is reduced and that damages to the carbon fibers are inhibited. Moreover is adhesion ensured between carbon cord and belt body by introducing a though small quantity of belt body flexible material into the cavities of the carbon cord. It is possible by adapting the properties of the different materials, i.e. the rupture risk reducing filler and the belt body flexible material, to optimize carbon cord and belt body for any specific application.

In a preferred embodiment of the invention the rupture risk reducing filler comprises epoxy resin and/or isocyanate which materials may be used as rupture risk reducing filler either separately, in any optional combination with each other or in combination with some other material. Advantages of the rupture risk reducing filler are a high damping property and a good flexibility. In addition may the rupture risk reducing filler serve as a coupling agent to establish connection between carbon cord and belt body to thereby ensure that the carbon cord is durably bonded to the belt body and the flexibility of said latter is being maintained.

One modification of this invention provides for the carbon cord to consist of carbon fibers twisted into yarns and/or of carbon fiber yarns twisted into yarn bundles. The rupture risk reducing material fills up the cavities between said carbon fibers twisted into yarns or yarn bundles almost completely. Advantageously it is possible to adapt the tensile strength of a drive belt to the requirements of any specific application by varying the number of carbon fibers each yarn and/or by providing a carbon cord that comprises several yarns. A carbon cord typically contains some hundreds up to several thousands of carbon fibers. One yarn bundle consists of at least two, typically three or more yarns which on their part are spirally twisted together.

It is for the purpose of this present invention that the cavities are filled up with rupture risk reducing filler almost completely when a second portion thereof is in relation to a first portion of the cavities totally 0.3 or less, preferably 0.2 or less, particularly preferred 0.15 or less.

According to another modification of this invention are the carbon fibers provided with a coating that surrounds sections at least of said fibers. This affords the advantage that the coating is apt to increase the resistance of the carbon fibers and that it can be in the form of a bonding agent improving adhesion between carbon fibers, rupture risk reducing filler and belt body flexible material and contributing to the stability of the drive belt.

Another modification of this invention provides for a coating to be applied to a working side of the belt body that is susceptible to wear. Provision of this coating reduces drive belt wear and increases the service life of the belt. Moreover can the friction between drive belt and a belt pulley contacting the belt be reduced by said coating.

It is according to a still further modification of this present invention that the coating comprises a wear reducing fabric layer which is in contact with the belt body and/or a friction reducing polyethylene layer that is arranged on a side of said fabric layer that is facing away from the belt body. Provision of the fabric layer affords the advantage that the antiwear properties of the drive belt are being improved and the service life of the belt is being prolonged. The polyethylene layer keeps the flexible material for the belt body from penetrating through free spaces of the fabric and from getting into a direct contact with a belt pulley. The belt body flexible material typically has an unacceptably high coefficient of friction of 0.6 or more as it coacts with what are customary belt pulley materials. Wear caused by such high friction is inhibited by avoiding a direct contact between belt pulley and belt body flexible material by means of the polyethylene layer. Friction coefficients as low as 0.4 or less can be obtained this way.

To achieve the underlying object the process of this present invention is in conjunction with the preamble of Patent claim 10 characterized by the fact that for forming a carbon cord the carbon fibers are immersed into a dipping bath comprising a rupture risk reducing filler for said filler to be applied to the carbon fibers or that the rupture risk reducing filler is extruded to the carbon fibers in a suitable extrusion process such that the fibers are covered and/or the cavities between the carbon fibers filled with rupture risk reducing filler almost completely wherein for embedding the carbon cords containing the rupture risk reducing filler into the belt body an amount less than 0.2 mg of curable belt body flexible material per one millimeter$^3$ cord volume is being introduced into the carbon cord.

It is an advantage that the process as proposed permits to provide the rupture risk reducing filler at low cost. The majority of cavities are reliably charged with filler material which has for consequence that a very small amount of flexible material only will be allowed to enter the carbon cord while pouring the belt body. This small quantity of flexible material has but little influence on the flexibility and/or the flexural modulus of the carbon cord on the one hand while it improves the adhesion of the carbon cord to the belt body and ensures a durable bond between both of these components on the other hand.

A plurality of carbon fibers are twisted into a yarn and immersed into a dipping bath containing rupture risk reducing filler when forming the carbon cords. Both of these process steps may be performed in any desired order which means that the carbon fibers can be immersed prior to twisting and the yarn subsequently be formed by twisting the fibers on the one hand while the yarn can be provided by twisting the carbon fibers first and by then immersing the yarn into the dipping bath on the other hand. The production process may be performed in several stages which means that several dipping steps and/or several twisting steps may be carried out in any desired order. The dipping bath may contain a proportionate amount of the filler to be introduced into the cavities while the dipping bath itself may also consist of filler material. The carbon fibers may be provided with a coating or be left uncoated.

A modification of the invention provides for at least two carbon fiber yarns to be twisted into a yarn bundle to produce a carbon cord. This advantageously permits to adapt the mechanical properties of a carbon cord to the requirements of any specific application and to vary them to vast extents. The process step of twisting said at least two yarns into a yarn bundle may be carried out before or after immersion of the carbon fibers into the dipping bath. The yarns are advisably twisted prior to being processed in an extruder.

A further modification of this invention to form a belt body provides for the carbon cord containing the rupture risk reducing filler to be wrapped with polyurethane as flexible material. This affords the advantage that the benefits of a polyurethane belt body are combined with those of a carbon cord of this invention. Belt body and carbon cord may be separately optimized for their respective application in that case. The carbon cord picks up a small quantity of the belt body polyurethane with the consequence that the flexibility of the carbon cord will be maintained, the service life of the drive belt will be increased and damages to the carbon fibers as they are flexed around belt pulleys will be avoided.

Further advantages of this present invention are as disclosed in the subclaims.

Exemplary embodiments of the invention will now be described with reference to the accompanying drawings.

In the drawings:

FIG. 1 is a longitudinal section through a drive belt according to the present invention;

FIG. 2 is a cross-section through the drive belt according to FIG. 1 along section line A-A; and FIG. 3 is a larger-scale cutaway of the area X in FIG. 2.

A drive belt 1 for transmitting a drive motion comprises as essential components a belt body 2 that defines the shape of the belt, a carbon cord 3 that extends in an axial direction L of said body 2 and that serves as a tensile reinforcement and a coating 4 arranged on a working side of the belt body 2 that is susceptible to wear. The carbon cord 3 serving as a tensile reinforcement is completely surrounded by the belt body 2 and used to increase the strength of the drive belt 1 in the belt axial direction L. Said carbon cord 3 consists of a plurality of individual carbon fibers 5 which are spirally twisted together.

A drive belt 1 of the invention as represented is a toothed belt whose body 2 has belt teeth 6 disposed in belt axial direction L. Reference to a drive belt 1 of toothed type is being made for example only because the belt may be of any other suitable design also such as in particular be a V-belt, a poly-V belt, a flat belt or such like.

As may be seen particularly from FIG. 2 there are a plurality of spaced-apart carbon cords 3 arranged cross to the belt axial direction L. This plurality of carbon cords will increase the strength of the belt body 2 even further in belt axial direction L. Also is the drive belt 1 given substantially identical physical properties cross to said belt axial direction L.

The belt body 2 is made of a curable flexible material, in particular polyurethane. The coating 4 of the belt body 2 is multi-layered. A first layer 7 in contact with the belt body 2 is a fabric layer which serves to increase the mechanical abrasion resistance of the drive belt 1 and to reduce the wear rate thereof. A second layer 8 is a polyethylene layer disposed on a flat side of the fabric layer 7 that is facing away from the belt body. Said polyethylene layer 8 may be a sheeting (polyethylene sheet) and primarily serves to reduce friction between the drive belt 1 and a not-shown belt pulley. Said closed polyethylene layer 8 keeps the flexible material for the belt body 2 from penetrating through free spaces of the fabric layer 7 and from getting into a direct contact with a belt pulley. Such direct contact of the flexible material of the belt body 2 with a belt pulley made of what are customary belt pulley materials would result in an unacceptably high friction coefficient of for instance 0.6 or over. The friction reducing polyethylene layer prevents such a direct contact of the flexible material with a belt pulley. A friction coefficient between said polyethylene layer 8 and the belt pulley material is typically 0.4 or less. The two-layer version of the coating 4 has been given for example only while said coating 4 of the invention may as well comprise more than two such layers or consist of just one layer such as a fabric layer 7 or the polyethylene layer 8.

It is for reasons of clarity and easy understanding that the individual carbon fibers 5 of just one of the three carbon cords 3 is shown while all the carbon cords 3 of the drive belt 1 consist of individual carbon fibers 5 which are spirally twisted together.

As may be clearly seen from the larger-scale detail according to FIG. 3 there are cavities 9 between the individual carbon fibers 5 of a carbon cord 3. A first portion 9' of said cavities 9 is filled with a rupture risk reducing filler 10 and a second portion 9" thereof with the flexible material forming the belt body 2. The majority of said cavities 9 contain the rupture risk reducing filler 10 while the much smaller second portion 9" of said cavities 9 comprises the flexible material of the belt body 2. One millimeter$^3$ of carbon cord volume contains less than 0.20 mg and preferably 0.18 mg or less of the flexible material for the belt body 2.

BRIEF DESCRIPTION OF THE DRAWINGS

The flexible material for the belt body 2 can penetrate into any cavities of a carbon cord 3 that are not charged with said filler 10. In particular, the invention is not restricted to making the flexible material penetrate into outer cavities 9" in the region between a surface and the core of a carbon cord 3. Said flexible material may as well be introduced into cavities 9" inside the carbon cord 3. Also may individual cavities 9 be left unfilled in part at least which means that they are not containing any rupture risk reducing filler 10 nor any flexible material of the belt body 2.

DETAILED DESCRIPTION OF THE INVENTION

Figure 1:
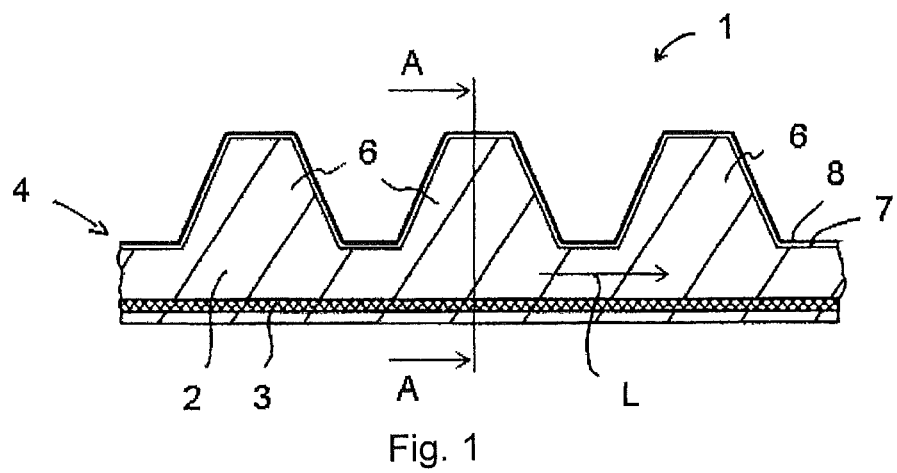
Figure 2:
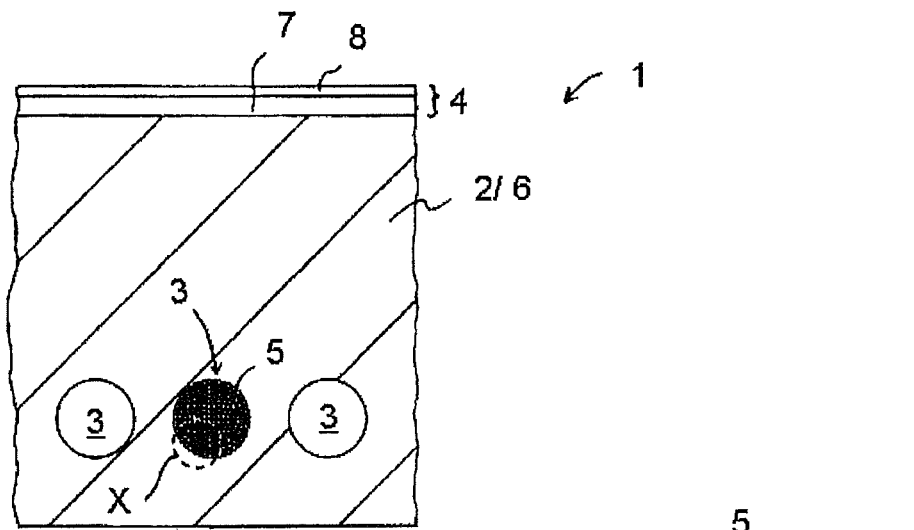
Figure 3:
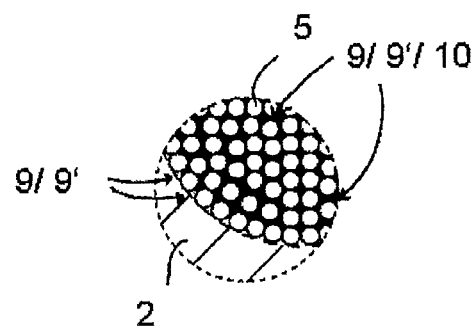

A plurality of carbon fibers 5 are twisted into a yarn to make a carbon cord 3. Said carbon fibers are immersed into a dipping bath for applying and/or introducing the rupture risk reducing filler 10. The rupture risk reducing filler 10 adheres to the carbon fibers 5 and/or fills up the first portion 9' of the cavities while being immersed. The process steps of twisting and immersing the carbon fibers 5 may be performed in any desired order. To meet the requirements of a specific application it is possible also to twist two or more yarns into a yarn bundle. Such twisting of two or more yarns into a yarn bundle in turn may be effected before or after immersing the carbon fibers 5 into the dipping bath.

Another process step in forming the belt body 2 is to wrap a carbon cord 3 containing the rupture risk reducing filler 10 with curable flexible material and to make part of said material penetrate into the second portion 9" of those cavities 9 which are not containing any rupture risk reducing filler 10. The carbon cord 3 is permanently retained in position after the flexible material has cured. Belt body 2 and carbon cord 3 are joined to each other via the bonding property of the rupture risk reducing filler 10 and/or of a not-shown coating of the carbon fibers 5 on the one hand and via the flexible material for the belt body 2 that is present in the second portion 9" of the cavities 9 on the other hand. Adhesion between belt body 2 and carbon cord 3 is so high that unacceptable separation of said carbon cord 3 from the belt body 2 during use is inhibited. This means that belt body 2 and carbon cord 3 are so fixed in position and material mated that tensile forces acting on the drive belt 1 are at least proportionately directed across the carbon cord 3 that serves as tensile reinforcement.

The rupture risk reducing filler 10 may for instance be a material free from polyurethane or a material other than the polyurethane used for the belt body 2.

The invention claimed is:

1. A drive belt having
a body which is made of a flexible material and
a tensile reinforcement which extends in a belt axial direction and is surrounded by said belt body in sections at least to improve the tensile strength of the body in belt longitudinal direction
wherein the tensile reinforcement is a carbon cord consisting of a plurality of twisted carbon fibers with a plurality of cavities between said fibers which cavities are filled with a filler material in part at least,
wherein a rupture risk reducing filler (10) different from the flexible material for the belt body (2) is filled into 77-86% by volume of the cavities (9) between said carbon fibers (5) and the flexible material for the belt body (2) is introduced into 23-14% by volume of said cavities (9), and wherein the carbon cord (3) contains less than 0.2 mg of the flexible material of the belt body (2) per one millimeter$^3$ cord volume.

2. The drive belt according to claim 1, wherein the rupture risk reducing filler (10) filling said first portion (9') of the cavities (9) comprises epoxy resin and/or isocyanate.

3. The drive belt according to claim 1, wherein the carbon cord (3) consists of carbon fibers (5) twisted into yarns and/or yarns of carbon fibers (5) which are twisted into yarn bundles, wherein the rupture risk reducing filler (10) fills up the cavities (9) between said carbon fibers (5) twisted into yarns and/or yarn bundles almost completely.

4. The drive belt according to claim 1, wherein the carbon fibers are provided with a fiber coating that surrounds said fibers in sections at least.

5. The drive belt according to claim 1, wherein on a working side susceptible to wear of the belt body (2) a coating (4) firmly bonded to said body (2) is arranged to improve wear resistance and/or to reduce friction.

6. The drive belt according to claim 5, wherein the coating (4) comprises
a wear reducing fabric layer (7) adhering to the belt body (2) and/or
a friction reducing layer (8) which latter is in the form of a sheet disposed on a flat side of the fabric layer (7) that is facing away from the belt body (2).

7. The drive belt according to claim 1, wherein the belt body (2) comprises polyurethane as flexible material.

8. The drive belt according to claim 7, wherein the rupture risk reducing filler (10) comprises a polyurethane material for said filler (10) different from the polyurethane material for the flexible material for the belt body (2).

9. The drive belt according to claim 1, wherein the belt body (2) has teeth (6) to provided a toothed belt.

10. A process for making a drive belt, which has a belt body made of a flexible material and a carbon cord that is surrounded by the belt body in sections at least and that extends in a belt axial direction, wherein said process comprises:
twisting together a plurality of carbon fibers into a yarn to provide the carbon cord having cavities (9) between the carbon fibers, and embedding the carbon cord into a curable flexible material to form the belt body, wherein for the purpose of producing the carbon cord (3)
the carbon fibers (5) are immersed into a dipping bath that contains a rupture risk reducing filler (10) different from the flexible material for the belt body (2) to apply said rupture risk reducing filler (10) to the carbon fibers (5) or the rupture risk reducing filler (10) is applied to the carbon fibers (5) by a suitable extrusion technique to thereby wrap said fibers (5) with rupture risk reducing filler (10), whereby the rupture risk reducing filler (10) is filled into 77-86% by volume of the cavities (9) between said carbon fibers (5), and the flexible material for the belt body (2) is introduced into 23-14% by volume of said cavities (9), and whereby an amount less than 0.2 mg of the curable flexible material for the belt body per one millimeter$^3$ cord volume is introduced into the carbon cord (3) so as to produce an inhomogeneous impregnation of said carbon cord (3).

11. The process according to claim 10, wherein the carbon fibers (5) are provided with a coating in sections at least before being immersed into the dipping bath containing the rupture risk reducing filler (10).

12. The process according to claim 10, wherein at least two yarns are twisted into a yarn bundle to form a carbon cord (3).

13. The process according to claim 10, wherein to form the belt body (2) the carbon cord (3) containing rupture risk reducing filler (10) is wrapped with polyurethane as curable flexible material.

14. The drive belt according to claim 6, wherein the friction reducing layer (8) is a polyethylene layer (8).

* * * * *